US012143813B2

(12) United States Patent
Taft et al.

(10) Patent No.: US 12,143,813 B2
(45) Date of Patent: Nov. 12, 2024

(54) SYSTEMS AND METHODS FOR UE-INITIATED NSSAA PROCEDURES

(71) Applicant: Verizon Patent and Licensing Inc., Basking Ridge, NJ (US)

(72) Inventors: David Taft, Keller, TX (US); Maqbool Chauhan, Keller, TX (US); Sudhakar Reddy Patil, Flower Mound, TX (US); Vinod Kumar Choyi, Conshohocken, PA (US); Jerry Steben, Fort Worth, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 134 days.

(21) Appl. No.: 17/492,051

(22) Filed: Oct. 1, 2021

(65) Prior Publication Data

US 2023/0106668 A1    Apr. 6, 2023

(51) Int. Cl.
*H04W 60/06* (2009.01)
*H04L 9/40* (2022.01)
*H04W 12/06* (2021.01)
*H04W 12/08* (2021.01)
*H04W 48/18* (2009.01)
*H04W 48/02* (2009.01)

(52) U.S. Cl.
CPC ......... *H04W 12/06* (2013.01); *H04L 63/0892* (2013.01); *H04W 12/08* (2013.01); *H04W 48/18* (2013.01)

(58) Field of Classification Search
CPC ..... H04W 12/06; H04W 12/08; H04W 48/18; H04L 63/0892
See application file for complete search history.

(56) References Cited

U.S. PATENT DOCUMENTS

2020/0267554 A1 *   8/2020   Faccin .................. H04W 12/08
2021/0368421 A1 * 11/2021   Venkataraman ...... H04W 60/06

FOREIGN PATENT DOCUMENTS

WO    WO-2021133092 A1 *   7/2021   ............ H04W 12/06
WO    WO-2022035257 A1 *   2/2022   ............. H04L 67/02

OTHER PUBLICATIONS

Ruiyu Dou, Songhui Guo, Qianfang Hao, Haidong Liu, Dazan Qian, Lei Sun; "5G Secondary Authentication based on EAP-TLS Protocol"; 2021 International Conference on Computer Technology and Media Convergence Design (CTMCD); Year: Jul. 2021 | Conference Paper | Publisher: IEEE; pp. 296-300 (Year: 2021).*

* cited by examiner

*Primary Examiner* — Fatoumata Traore
*Assistant Examiner* — Courtney D Fields (57) ABSTRACT

Systems and methods described herein provide for User Equipment (UE)-initiated authentication and authorization updates to Network Slice-Specific Authentication and Authorization (NSSAA). A network device in a core network receives a message from a user device outside of the core network, wherein the message includes a request to initiate a NSSAA procedure. The network device initiates the NSSAA procedure in response to the request. The systems and methods also provide for UE-initiated authorization revocation of NSSAA.

20 Claims, 10 Drawing Sheets

SYSTEMS AND METHODS FOR UE-INITIATED NSSAA PROCEDURES

BACKGROUND

Next Generation mobile networks, such as Fifth Generation (5G) mobile networks, are being implemented as the next stage networks in the evolution of mobile wireless networks. 5G networks incorporate many new advances in technology. For example, a 5G network may have the capability to perform network slicing to increase network efficiency and performance. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources and may be configured to implement a different set of requirements.

DETAILED DESCRIPTION OF EXAMPLE EMBODIMENTS

The following detailed description refers to the accompanying drawings. The same reference numbers in different drawings may identify the same or similar elements.

Due to increasing bandwidth capability of the 5G wireless network systems, mobile network operators may soon be managing hundreds or thousands of network slices. Each slice can have its own architecture, management, and security to support a specific use case. Therefore, authentication will become a critical component of network slicing. Accordingly, a network slice-specific authentication and authorization (NSSAA) process is defined in 3rd Generation Partnership Project (3GPP) standard protocol processes. The NSSAA process is performed for access of the network slice by any application service. Current protocols provide for a network-initiated authentication and authorization to the NSSAA. However, currently no process exists for User Equipment (UE)-initiated NSSAA procedures.

UE-initiated authentication and authorization may be necessary for maintenance or normal operations with various authentication, authorization, and accounting (AAA) deployment scenarios. Furthermore, a UE-initiated authentication and authorization procedure update may be needed in scenarios where reattempts are made to register after unsuccessful registration attempts have been made. Such UE-initiated procedures may also be helpful for customer care when dealing with faulty UEs rather than initiating procedures from other core network devices. Furthermore, UE-initiated authentication and authorization may be necessary for mutual authentication with a AAA server during ongoing communication sessions of sensitive or critical data.

Systems and methods described herein allow for a UE-initiated authentication and authorization procedures for NSSAA. A network device (e.g., an access and mobility management function (AMF)) in a core network may receive a message from a user device (e.g., a UE device or a third-party computing device) outside of the core network. The message may include a request to initiate a NSSAA procedure, such as an NSSAA update procedure or authorization revocation procedure. The network device may initiate the NSSAA procedure in response to the request.

Figure 1:
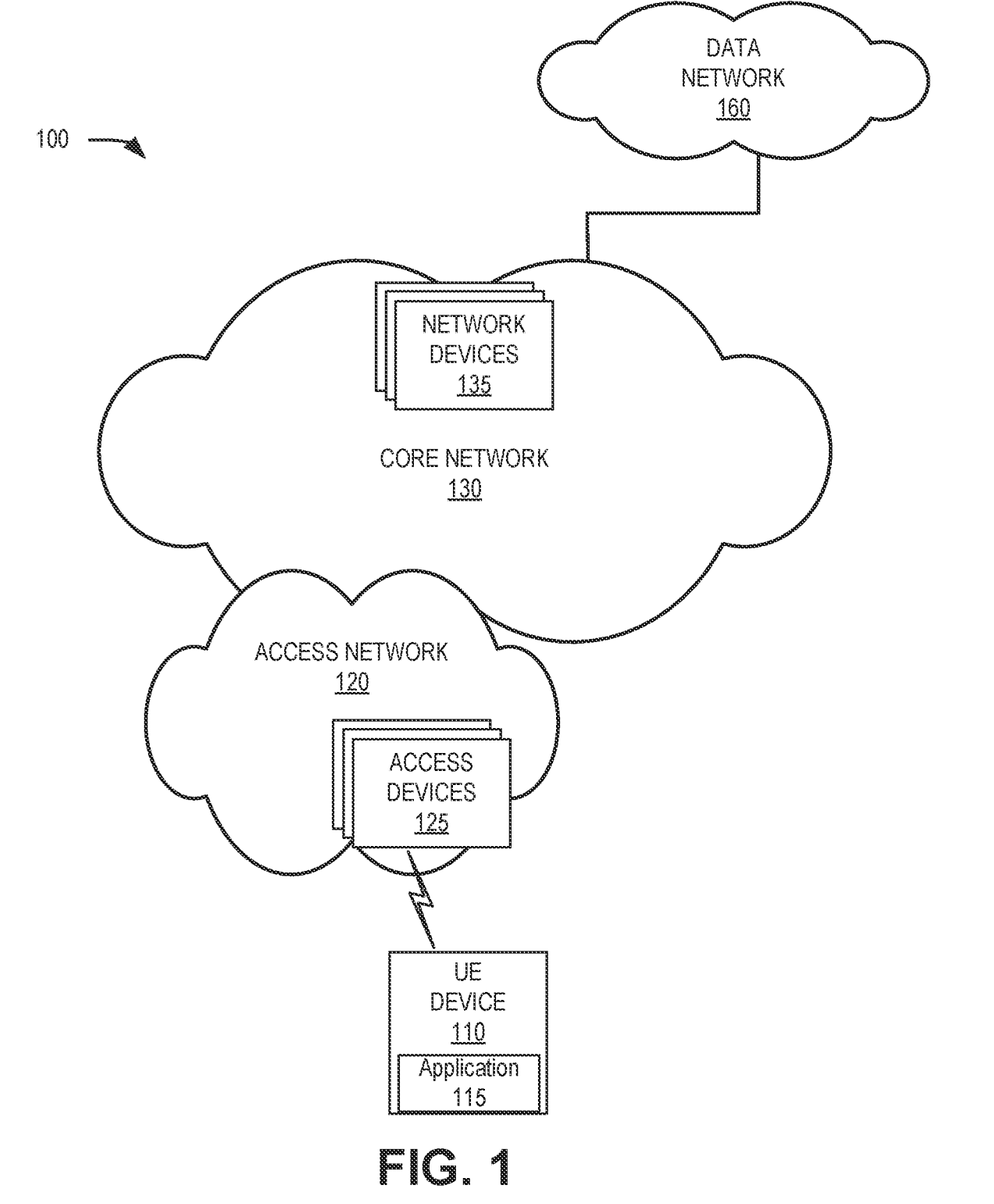
FIG. 1 is a diagram illustrating an example network environment in which systems and methods described herein may be implemented.

FIG. 1 is a diagram of an example environment 100 in which the systems and/or methods described herein may be implemented. As shown in FIG. 1, environment 100 may include a UE device 110, an access network 120 including access devices 125, a core network 130 with network devices 135, and a data network 160. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 100 are exemplary.

UE device 110 may include any device with long-range (e.g., cellular or mobile wireless network) wireless communication functionality. UE device 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or another device that includes cellular communication capabilities. In other implementations, UE device 110 may be implemented as a machine-type communications (MTC) device, an Internet of Things (IoT) device, a machine-to-machine (M2M) device, etc. According to implementations described herein, UE device 110 may be provisioned (e.g., via a subscriber identity module (SIM) card or another secure element) to recognize particular network identifiers and to support particular RF spectrum ranges.

According to an embodiment, UE device 110 may include one or more applications 115 that are associated with Subscribed-Network Slice Selection Assistance Information (S-NSSAI). When a UE device attaches to the access network 120 to receive the service on the network slice, the UE device 110 typically provides the S-NSSAI to the access device 125. According to an implementation, application 115 may trigger UE device 110 to send a message to devices in core network 130 to initiate the NSSAA, or an Authorization revocation procedure. According to another implementation, application 115 may be configured to initiate the NSSAA or Authorization revocation procedure for certain events or at certain intervals.

Access network 120 may include one or multiple networks of one or multiple types and technologies that support network slicing. For example, access network 120 may be implemented to include a 5G-radio access network (5G-RAN), a future generation RAN (e.g., a 6G-RAN or subsequent generation RAN). Access network 120 may also include a legacy RAN (e.g., a Third Generation (3G) RAN, a 4G or 4.5 RAN, etc.). Access network 120 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an open RAN (O-RAN) network, a virtualized RAN (vRAN), a self-organizing network (SON), a wired network (e.g., optical, cable, etc.), an optical network, or another type of network that provides access to or can be used as an on-ramp to access network 120, core network 130, and/or data network 160.

Depending on the implementation, access network 120 may include one or multiple types of network devices, such as access devices 125. For example, access device 125 may include a next generation Node B (gNB), an evolved Long Term Evolution (eLTE) eNB, an eNB, a radio network controller (RNC), a remote radio head (RRH), a baseband unit (BBU), a radio unit (RU), a centralized unit (CU), a CU control plane (CU CP), a CU user plane (CU UP), a Distributed Unit (DU), a small cell node (e.g., a picocell device, a femtocell device, a microcell device, a home eNB, etc.), 5G ultra-wide band (UWB) nodes, a future generation wireless access device (e.g., a 6G wireless station, etc.), another type of wireless node (e.g., a WiFi device, a WiMax device, a hotspot device, etc.) that provides a wireless access service, or another type of network device that provides a transport service (e.g., routing and forwarding). Additionally, or alternatively, access device 125 may include a wired and/or optical device (e.g., modem, wired access point, optical access point, Ethernet device, etc.) that provides network access. According to some exemplary implementations, access device 125 may include a combined functionality of multiple RATs (e.g., 4G and 5G functionality, 5G and 5.5G functionality, etc.) based on demands and needs. According to some exemplary implementations, access device 125 may include an integrated functionality, such as a CU-CP and a CU-UP, or other integrations of split RAN nodes. Access device 125 may be an indoor device or an outdoor device.

Core network 130 may include one or multiple networks of one or multiple types. For example, core network 130 may be implemented to include a terrestrial network and/or a satellite network. According to an exemplary implementation, core network 130 includes a network that may interact with multiple types of access networks 120. For example, core network 130 may include the core part of an LTE network, an LTE-A network, a 5G network, a legacy network, and so forth.

Depending on the implementation, core network 130 may include various network elements that may be implemented in network devices 135. Network devices 135 may include physical function nodes, virtual network functions (VNFs) or containerized network functions (CNF). Thus, the components of core network 130 may be implemented as dedicated hardware components and/or as VNFs implemented on top of a commonly shared physical infrastructure using, for example, Software Defined Networking (SDN). Such network elements may include a mobility management entity (MME), a user plane function (UPF), a session management function (SMF), a core access and mobility management function (AMF), a unified data management (UDM), a packet data network gateway (PGW), a serving gateway (SGW), a policy control function (PCF), an authentication server function (AUSF), a home subscriber server (HSS), as well other network elements pertaining to various network-related functions, such as billing, security, authentication and authorization, network polices, subscriber profiles, network slicing, and/or other network elements that facilitate the operation of core network 130. In some implementations, one or network devices 135 may provide information to access devices 125 to facilitate network slicing and NSSAA.

Data network 160 may include one or multiple networks. For example, data network 160 may be implemented to provide a service or include an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, data network 160 may include various network devices that provide various applications, services, or other type of UE device assets (e.g., servers (e.g., web, application, cloud, etc.), mass storage devices, data center devices), and/or other types of network services pertaining to various network-related functions. According to an implementation described herein, data network 160 may include one or more application functions, which provide application services to UE devices 110. Core network 130 may associate each application function with a network slice to service UE devices 110.

Although FIG. 1 shows example components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
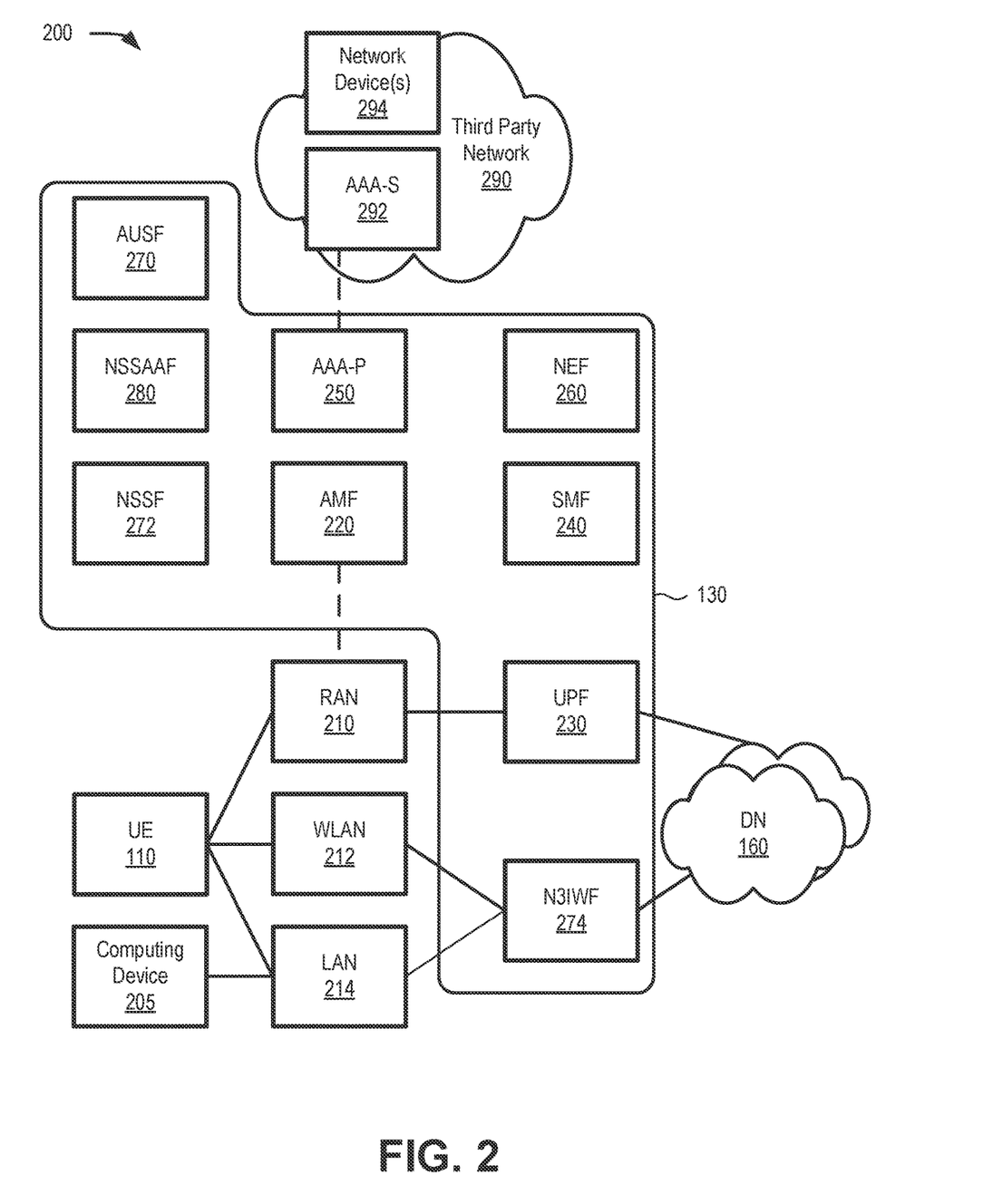
FIG. 2 is a diagram illustrating connections among devices in a portion of a core network.

FIG. 2 is a diagram illustrating a portion 200 of environment 100 that includes components of core network 130 in the context of environment 100, according to an implementation described herein. As shown in FIG. 2, portion 200 may include UE device 110, core network 130, data networks 160, computing device 205, RAN 210, WLAN 212, LAN 214, and a third-party network 290. Core network 130 may include AMF 220, UPF 230, SMF 240, an authentication, authorization, and accounting proxy (AAA-P) 250, a Network Exposure Function (NEF) 260, an Authentication Server Function (AUSF) 270, a Network Slice Selection Function (NSSF) 272, a Non-3GPP Inter-Working Function (N3IWF) 274, and a NSSAA function (NSSAAF) 280. AMF 220, UPF 230, SMF 240, AAA-P 250, NEF 260, AUSF 270, NSSF 272, N3IWF 274, and NSSAAF 280 may correspond to network devices 135. Third party network 290 may include a AAA server (AAA-S) 292 and other network devices 294.

Computing device 205 may include a communication and/or computational device. Computing device 205 may be implemented as a mobile device, a portable device, or a stationary device. For example, computing device 205 may be implemented as a smartphone, a tablet, a computer (e.g., a laptop, a desktop, a palmtop, etc.), a personal digital assistant, a terminal, and so forth. According to an implementation, computing device 205 provides users (e.g., an administrator of an enterprise network) with access to core network 130 (e.g., AMF 220). For example, computing device 205 may include a client, or other suitable software application, that permits computing device 205 to send a message to AMF 220 to initiate a NSSAA procedure or an authorization revocation procedure for a particular EPA ID and S-NSSAI.

RAN 210, WLAN 212, and LAN 214 may be different aspects of access network 120. RAN 210 may provide cellular broadband services via an access station (e.g., corresponding to access device 125). The access station may include a transceiver system that connects a UE device 110 to other components of RAN 210 and core network 130 using wireless/wired interfaces. The access station may be implemented as a base station (BS), a next generation Node B (gNB), a base transceiver station (BTS), an evolved Node B (eNB), an evolved LTE (eLTE) eNB, a remote radio head (RRH), an RRH and a baseband unit (BBU), a BBU, or other type of wireless node (e.g., a picocell node, a femtocell node, a microcell node, etc.) that provides wireless access to RAN 210. The access station support a RAN 210 having one or more radio access technology (RAT)-types. For example, in one implementation, RAN 210 may include a 5G RAN.

WLAN 212 may provide access to data network 160 via an access point (e.g., corresponding to access device 125). The access point may include a device with a transceiver configured to communicate with UE device 110 using Wi-Fi signals based on the Institute of Electrical and Electronics Engineers (IEEE) 802.11 standards for implementing a wireless LAN. The access point may enable UE device 110 to communicate with other devices in WLAN 212 and with other devices in data network 160 or other networks.

LAN 214 may provide a wired connectivity to access to data network 160 via a router (e.g., corresponding to access device 125). The router may include one or more network devices that process and/or forward traffic. The router may, for example, provide connectivity of UE device 110 to data network 160 by serving as a traffic exit/entry point for UE devices 110. According to different implementations, the router may include a home or residential router.

The components depicted in FIG. 2 may be implemented as dedicated hardware components or as virtualized functions implemented on top of a common shared physical infrastructure using software-defined networking (SDN). For example, an SDN controller may implement one or more of the components of FIG. 2 using an adapter implementing a virtual network function (VNF) virtual machine, an event driven serverless architecture interface, and/or another type of SDN architecture. The common shared physical infrastructure may be implemented using one or more devices 300 described below with reference to FIG. 3 in a cloud computing center associated with core network 130. Additionally, or alternatively, some, or all, of the common shared physical infrastructure may be implemented using one or more devices 300 described below with reference to FIG. 3 using a MEC system associated with access devices 125.

AMF 220 may be a network function that is capable of performing registration management, connection management, reachability management, mobility management, lawful intercepts, access authentication and authorization, location services management, functionality to support non-3GPP access networks, and/or other types of management processes. AMF 220 may provide a Generic Public Subscription Identifier (GPSI) of the UE device 110 related to the S-NSSAI to a AAA Server (e.g., AAA server 292) to allow the AAA server to initiate the NSSAA, or the Authorization revocation procedure, where the current AMF serving UE device 110 needs to be identified so that the UE authorization status can be challenged or revoked.

According to implementations described herein, AMF 220 may be configured to receive a message from a UE device 110 or another device outside of core network 130. The message may include a request to initiate a NSSAA procedure. In response to the request, AMF 220 may initiate the NSSAA procedure by providing a request to another network element in core network, such as NSSAAF 280 described further below. According to an implementation, AMF 220 may be configured to respond to requests from UE device 110 to initiate an NSSAA procedure on-demand.

UPF 230 may be a network function that is capable of maintaining an anchor point for intra/inter-RAT mobility, maintain an external Packet Data Unit (PDU) point of interconnect to a particular data network 160, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., access device 125), and/or perform other types of user plane processes.

SMF 240 may be a network element that is capable of performing session establishment, session modification, and/or session release, perform IP address allocation and management, perform Dynamic Host Configuration Protocol (DHCP) functions, perform selection and control of UPF 230, configure traffic steering at UPF 230 to guide the traffic to the correct destinations, perform lawful intercepts, control and coordinate of charging data collection, terminate session management parts of Non-Access Stratum (NAS) messages, perform downlink data notification, and/or perform other types of control plane processes for managing user plane data.

AAA-P 250 and AAA-S 292 may provide authentication, authorization, and accounting services. In some implementations, functions of AAA-P 250 and AAA-S 292 may be divided as a proxy/server arrangement. For example, when AAA-S 292 belongs to a third party, AAA 292-S may be part of third party network 290. AAA-P 250 in core network 130 may act as a proxy through which NSSAAF 280 may contact the AAA-S 292. In other embodiments, either AAA-P 250 or AAA-S 292 may be implemented as a stand-alone AAA server. The AAA server may include scripts and/or programs for authentication procedures and information for registered third-party recipients to ensure that notifications provided to registered third-party recipient devices are received only by the intended recipients. For example, AAA server 292 may include pass codes, voice biometric data, or other user authentication information that can be provided by a registered third-party recipient at, for example, the time of registration. In some implementations, AAA-S 292 may coordinate with NSSAAF 280 for slice-specific authentication and authorization.

NEF 260 may be a network function (NF) that is capable of exposing capabilities and events to other NFs, including third party NFs, application functions, edge computing NFs, and/or other types of NFs. Furthermore, NEF 260 may secure provisioning of information from external applications to core network 130, translate information between core network 130 and devices/networks external to core network 130, support a Packet Flow Description (PFD) function, and/or perform other types of network exposure functions.

AUSF 270 may be a network function that is capable of performing authentication. For example, AUSF 270 may implement an Extensible Authentication Protocol (EAP)

authentication server and may store authentication keys for UE devices 110. AUSF 270 may relay EAP messages towards an AAA-S 292 or AAA-P 250 and perform related protocol conversion, as needed. AUSF 270 may also provide notification to the current AMF where UE device 110 is of the need to re-authenticate and re-authorize the UE or to revoke the UE authorization.

NSSF 272 may be a network function that is capable of selecting a set of network slice instances to serve a particular UE device 110. NSSF 272 may determine network slice selection assistance information (NSSAI), determine a particular AMF 220 to serve a particular UE device 110, and/or perform other types of processing associated with network slice selection or management.

N3IWF 274 may be a network function that is capable of interconnecting to a non-3GPP access device, such as, for example, a WiFi access point (not shown in FIG. 2) for WLAN 212. N3IWF 274 may facilitate handovers for UE device 110 between RAN 210 and a non-3GPP access device 125 (e.g., WiFi access point, LAN router, etc.).

NSSAAF 280 may be a network function that supports Network Slice-Specific Authentication and Authorization with an AAA, such as AAA-P 250/AAA-S 292. If the AAA-S belongs to a third party, NSSAAF 280 may contact the AAA-S (e.g., AAA-S 252) via an AAA-P (e.g., AAA-P 250). NSSAAF 280 may provide slice-specific authentication and authorization for a given UE device 110. NSSAAF 280 may act as a NF service producer to AMF 220, which may act as the NF service consumer. NSSAAF 280 may be accessible by other function nodes via a structured Nnssaaf interface.

Network device 294 may include an application function (e.g., in addition to AAA-S 292) for third-party network 290. According to an implementation, network device 294 may be configured to send a message to AMF 220 to initiate a NSSAA procedure or an authorization revocation procedure for a particular EPA ID and S-NSSAI.

According to implementations described herein, UE device 110 or computing device 205 (collectively referred to herein as "user devices") may execute an application 115 and provide an interface for interacting with a particular service provider, such as third party application provider using third party network 290. The application may include a trigger capability for UE device 110/computing device 205 to send a message to AMF 220 to initiate a NSSAA procedure or an Authorization revocation procedure. According to another implementation, internal network devices 135 or third-party network devices 294 (collectively referred to as "network devices 135/294") may send a message to AMF 220 to initiate a NSSAA procedure or an Authorization revocation procedure for a UE device 110.

Although FIG. 2 shows exemplary components of core network 130, in other implementations, core network 130 may include fewer components, different components, differently arranged components, or additional components than depicted in FIG. 2. Additionally or alternatively, one or more components of core network 130 may perform functions described as being performed by one or more other components of core network 130. Furthermore, while particular interfaces have been described with respect to particular function nodes in FIG. 2, additionally, or alternatively, core network 130 may include a reference point architecture that includes point-to-point interfaces between particular function nodes.

Figure 3:
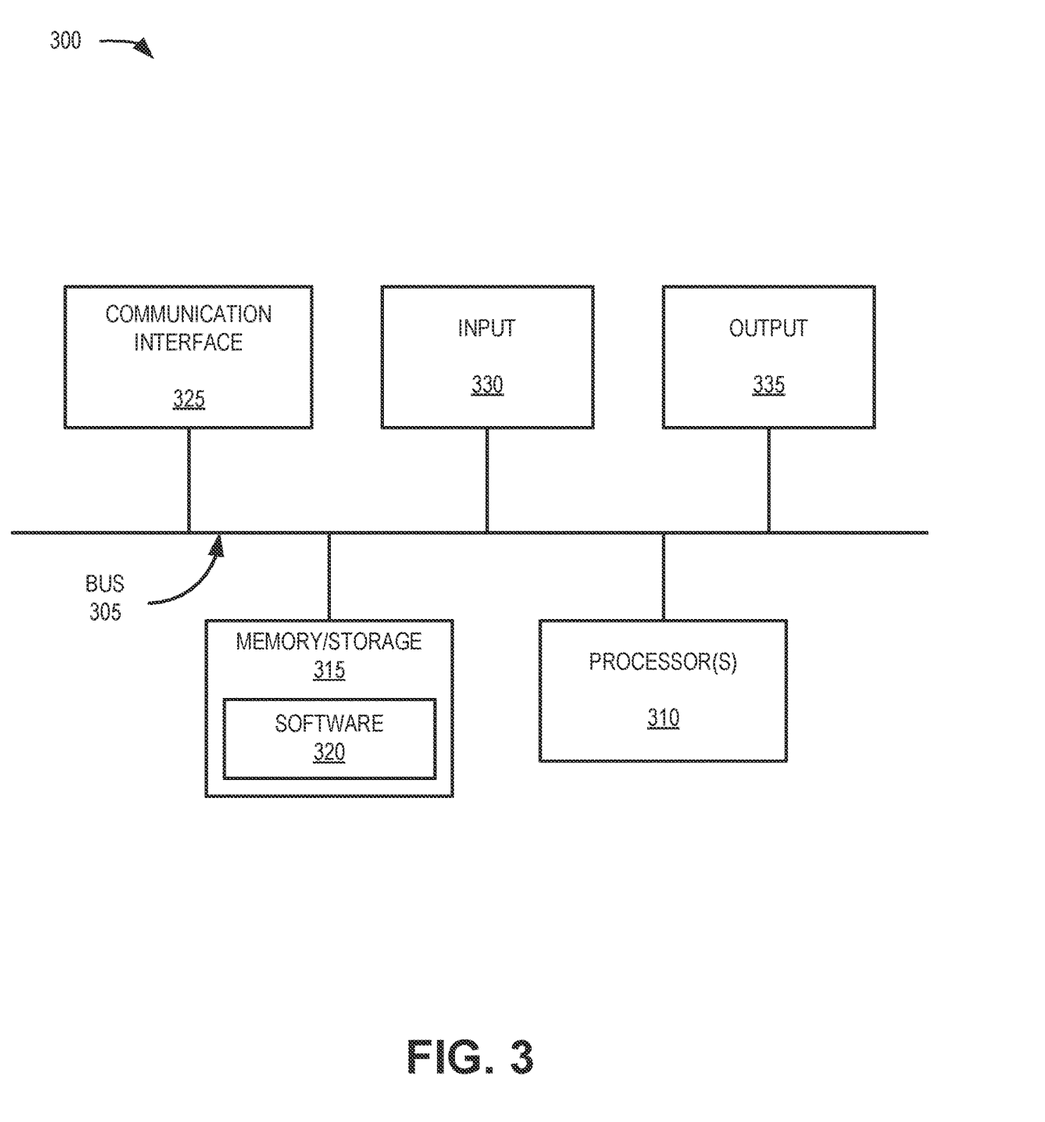
FIG. 3 is a diagram illustrating example components of a device that may correspond to one or more of the devices described herein.

FIG. 3 is a diagram illustrating example components of a device 300 according to an implementation described herein. UE device 110, access device 125, AMF 220, UPF 230, SMF 240, AAA 250, NEF 260, AUSF 270, NSSF 272, N3IWF 274, NSSAAF 280, AAA 292, and/or other components of access network 120 and core network 130, may each include one or more devices 300. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include drives for reading from and writing to the storage medium.

Memory/storage 315 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. As an example, with reference to AMF 220, software 320 may include an application that, when executed by processor 310, provides a function and/or a process to recognize trigger messages from user devices to initiate NSSAA procedures, as described herein. Software 320 may also include firmware, middleware, microcode, hardware description language (HDL), and/or other form of instruction. Software 320 may also be virtualized. Software 320 may further include an operating system (OS) (e.g., Windows, Linux, Android, proprietary, etc.).

Communication interface 325 permits device 300 to communicate with other devices, networks, systems, and/or the like. Communication interface 325 includes one or multiple wireless interfaces and/or wired interfaces. For example, communication interface 325 may include one or multiple transmitters and receivers, or transceivers. Communication interface 325 may operate according to a protocol stack and a communication standard. Communication interface 325 may include an antenna. Communication interface 325 may include various processing logic or circuitry (e.g., multiplexing/de-multiplexing, filtering, amplifying, converting, error correction, application programming interface (API), etc.). Communication interface 325 may be implemented as a point-to-point interface, a service-based interface, or a reference interface, for example.

Input 330 permits an input into device 300. For example, input 330 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 300 may be implemented in an appropriate manner to support the architectures. For example, software components may be instantiated, created, deleted on device 300, or be placed in some operational state during its life-cycle (e.g., refreshed, paused, suspended, rebooting, or another type of state or status), using well-known virtualization technologies (e.g., hypervisor, container engine, virtual container, virtual machine, etc.) in an application service layer of a network (e.g., access network 130) and/or another type of network (e.g., core network 130, external network 160, etc.). Thus, network devices described herein may be implemented as device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 may cause processor 310 to perform a function or a process described herein. Alternatively, for example, according to other implementations, device 300 performs a function or a process described herein based on the execution of hardware (processor 310, etc.).

Figure 4A:
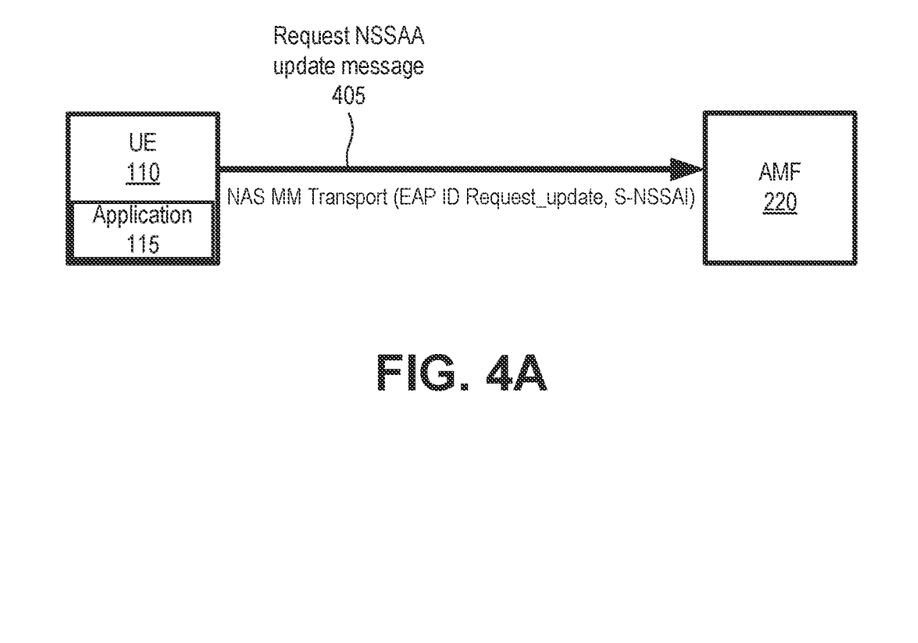
FIGS. 4A-4F are diagrams illustrating different messages to initiate a network slice-specific authentication and authorization (NSSAA) procedure.

FIG. 4A is an example of a request NSSAA update message 405. Request NSSAA update message 415 may cause AMF 220 to perform an NSSAA procedure without a separate determination from AMF 220 or a re-authentication request from an AAA-S. According to one implementation, request NSSAA update message 405 may be initiated by UE device 110. According to another implementation, request NSSAA update message 405 may be initiated by a third-party application (e.g., application 115 executed on UE device 110). Request NSSAA update message 405 may be sent to AMF 220 via RAN 210 (not shown in FIG. 4A), for example. In one implementation of FIG. 4A, request NSSAA update message 405 may be provided using NAS protocols, such as a NAS Mobility Management (MM) transport message. Message 405 may include a new Extensible Authentication Protocol (EAP) identity update message format (e.g., "EAP ID Request_update") to initiate an NSSAA update procedure by AMF 220.

Parameters for message 405 may include the user identifier for EAP (i.e., EAP ID) for the relevant S-NSSAI, along with the S-NSSAI itself. According to implementations described herein, AMF 220 may include the functionality to receive message 405 from UE device 110 and perform the requested function (e.g., to trigger an update NSSAA procedure). Thus, AMF 220 may trigger slice-specific authentication and authorization by directing parameters from request NSSAA update message 405 to NSSAAF 280, for example, without having to request information from UE device 110.

Figure 4B:
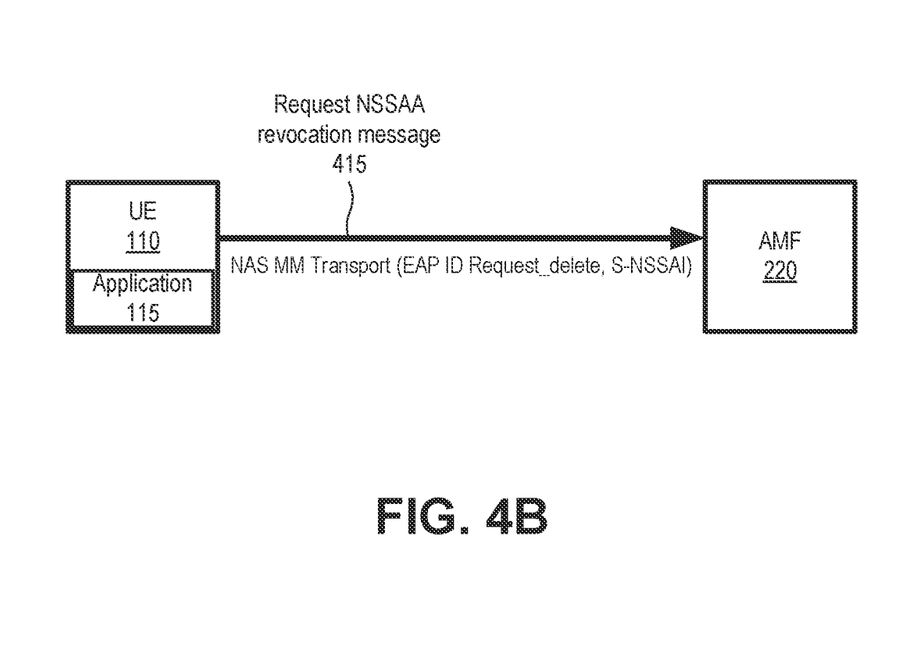

FIG. 4B is an example of a request NSSAA delete message 415. Request NSSAA delete message 415 may cause AMF 220 to initiate an NSSAA revocation procedure. Similar to request NSSAA update message 405 described above, request NSSAA delete message 415 may be initiated by UE device 110 or application 115 executed on UE device 110. Request NSSAA delete message 415 may be sent to AMF 220 via RAN 210 (not shown in FIG. 4B), for example. In the implementation of FIG. 4B, request NSSAA delete message 415 may be provided as a NAS Mobility Management transport message. Message 415 may include a new Extensible Authentication Protocol (EAP) identity revocation message format (e.g., "EAP ID Request_delete") to initiate an NSSAA authorization revocation procedure by AMF 220. Parameters for message 415 may include the same or similar parameters to those of request NSSAA update message 405 (i.e., EAP ID and S-NSSAI). AMF 220 may include functionality to receive request NSSAA delete message 415 from UE device 110 and perform the requested function (e.g., to trigger NSSAA authentication revocation procedure).

Referring collectively to FIGS. 4A and 4B, according to another implementation, a different device than UE device 110 may send request NSSAA update message 405 or request NSSAA delete message 415. For example, in another implementation, a device from a third party (e.g., computing device 205) may send request NSSAA update message 405 or request NSSAA delete message 415 to initiate an NSSAA procedure. A request NSSAA update message 405 originating from computing device 205, for example, may include the same parameters as when request NSSAA update message 405 originates from UE device 110.

Figure 4C:
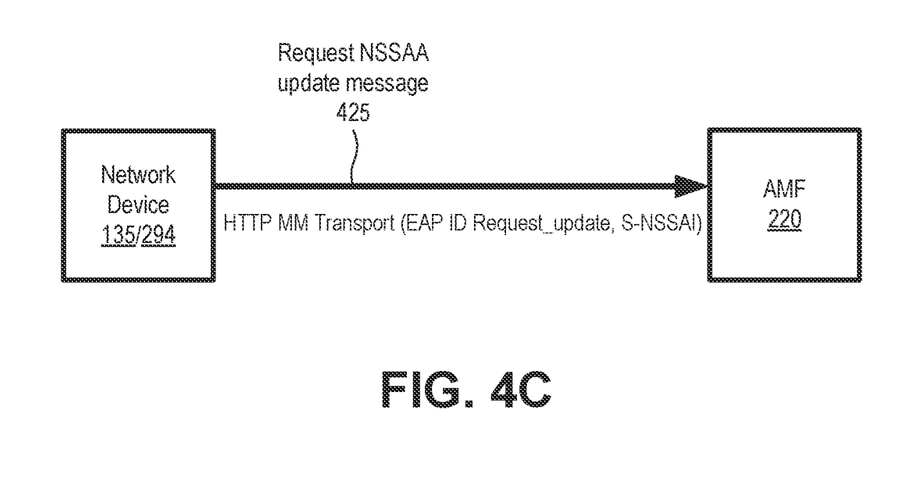

FIG. 4C is an example of another request NSSAA update message 425. In contrast with request NSSAA update message 405 of FIG. 4A, request NSSAA update message 425 may be initiated by an internal or external network device (e.g., network device 135/294). Thus, request NSSAA update message 425 may be sent to AMF 220 via backend network links (not shown in FIG. 4C), for example, without the need for NAS messaging. In the implementation of FIG. 4C, request NSSAA update message 425 may be provided using an HTTP protocol, such as HTTP 2.0. Similar to message 405 described above, message 425 may include a new EAP identity update message format (e.g., "EAP ID Request_update") to initiate an NSSAA update procedure by AMF 220 for a given set of EAP ID and S-NSSAI parameters. Request NSSAA update message 425 may be used by a network administrator, for example, to trigger a re-authentication or authorization process due to network updates.

Figure 4D:
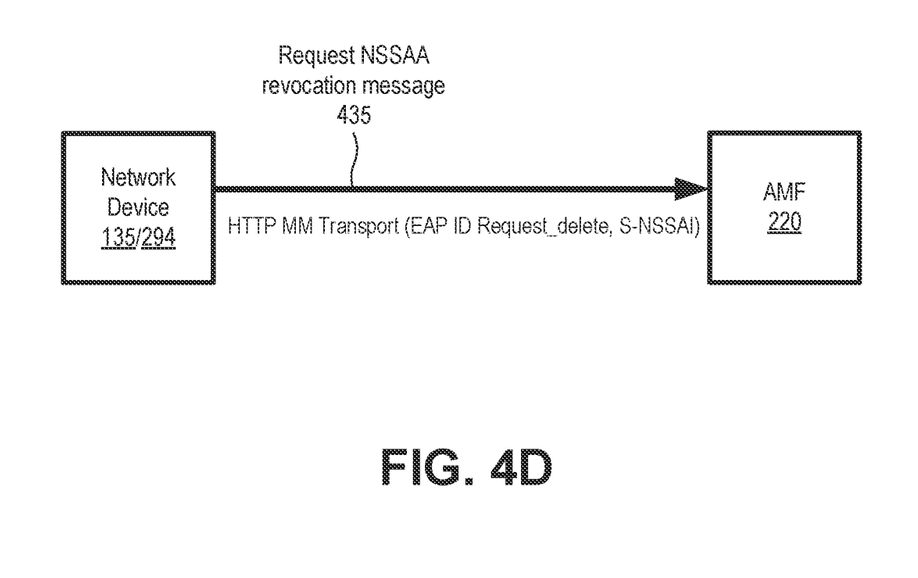

FIG. 4D is an example of a request NSSAA delete message 435. Similar to request NSSAA update message 425 described above, request NSSAA delete message 435 may be initiated by an internal or external network device (e.g., network device 135/294) and sent to AMF 220 via backend network links (now shown). Request NSSAA delete message 435 may be provided using an HTTP protocol, such as HTTP 2.0. Similar to message 425 described above, message 435 may include a new EAP identity revocation message format (e.g., "EAP ID Request_update") to initiate an NSSAA revocation procedure by AMF 220 for a given set of EAP ID and S-NSSAI parameters.

Figure 4E:
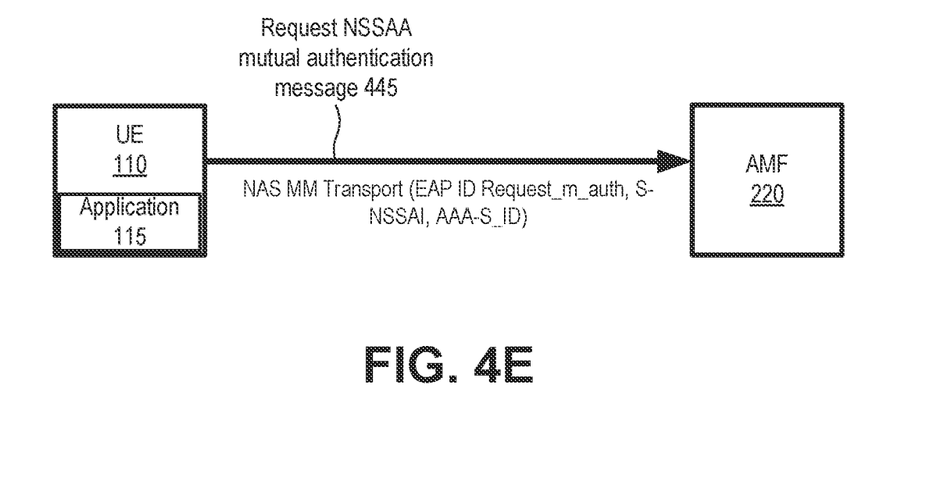

FIG. 4E is an example of a request NSSAA mutual authentication message 445. In certain use cases, UE device 110 may seek confirmation that it is connected to the correct network slice. For example, implemented as an IoT device, UE device 110 may be connected a Public Safety slice and therefore would like to periodically authenticate that it is indeed connected to the right slice and feeding information to the appropriate server. Request NSSAA mutual authentication message 445 may provide the ability for UE device 110/application 115 to initiate mutual authentication with AAA-S 292, for example. Similar to request NSSAA update message 405 described above, request NSSAA mutual authentication message 445 may be sent to AMF 220 via RAN 210 (not shown) using a NAS Mobility Management transport message. Message 445 may include a new Extensible Authentication Protocol (EAP) identity update message format (e.g., "EAP ID Request_m_auth") to initiate an NSSAA mutual authentication procedure by AMF 220. Parameters for message 445 may include the user identifier for EAP (i.e., EAP ID) for the relevant S-NSSAI, with the S-NSSAI itself, and an AAA-S identifier (AAA-S_ID, such as a network address). AMF 220 may include functionality to receive request NSSAA mutual authentication message 445 from UE device 110 and perform the requested function (e.g., to trigger an NSSAA authentication confirmation procedure with AAA-S 292), as described further in connection with FIG. 5C.

Figure 4F:
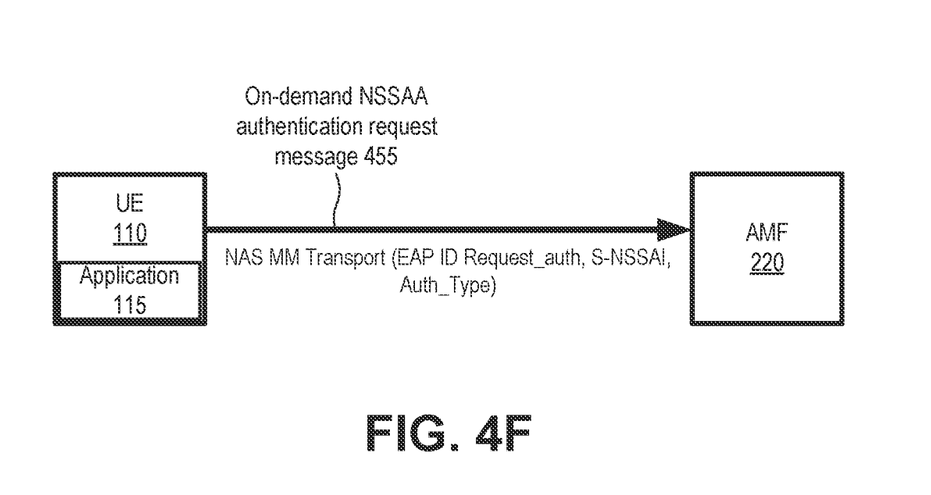

FIG. 4F is an example of an on-demand NSSAA authentication request message 455. On-demand NSSAA authentication request message 455 may provide a generic message structure for UE device 110/application 115 to initiate an NSSAA procedure for UE device authentication, AAA-S authentication, or mutual authentication. Similar to request NSSAA update message 405 described above, on-demand NSSAA authentication request message 455 may be sent to AMF 220 via RAN 210 (not shown) using a NAS Mobility Management transport message. Message 455 may include a new Extensible Authentication Protocol (EAP) identity update message format (e.g., "EAP ID Request_auth") to initiate an NSSAA authentication procedure by AMF 220. Parameters for message 455 may include the user identifier for EAP (i.e., EAP ID) for the relevant S-NSSAI, with the S-NSSAI itself, an authentication type ("Auth_Type") flag, and, if needed, an AAA-S ID. The authentication type flag may indicate a type of authentication requested by the UE device 110, such as UE authentication (e.g. as described above in connection with FIG. 4A), mutual authentication (e.g., as described above in connection with FIG. 4E), or server authentication (e.g, for AAA-S 292). AMF 220 may include functionality to receive on-demand NSSAA authentication request message 455 from UE device 110 and initiate the requested NSSAA procedure (e.g., the procedure as indicated by the "Auth_Type" flag).

Figure 5A:
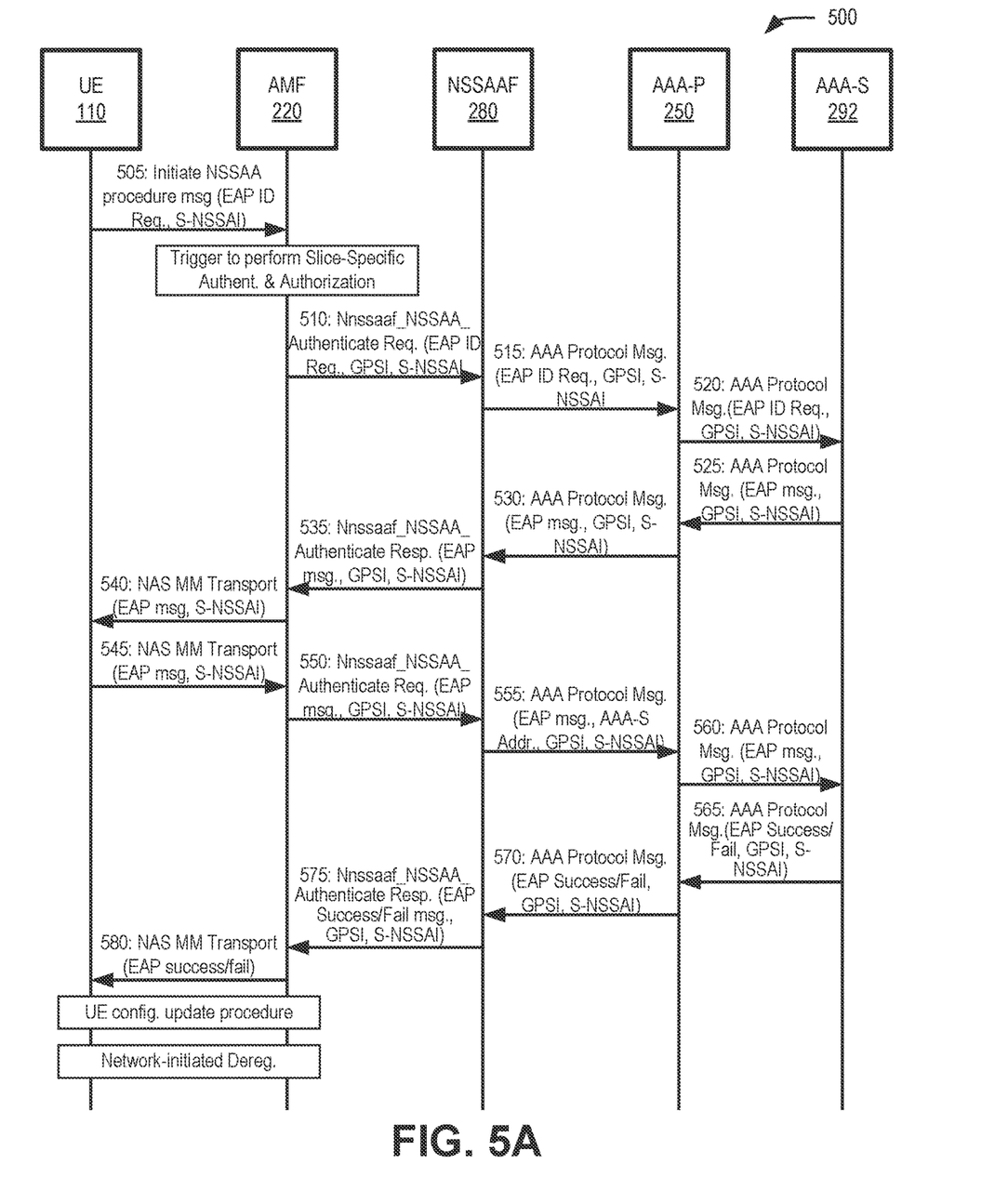
FIG. 5A-5C are diagrams illustrating communications for performing a UE-initiated authentication and authorization update to NSSAA.
Figure 5B:
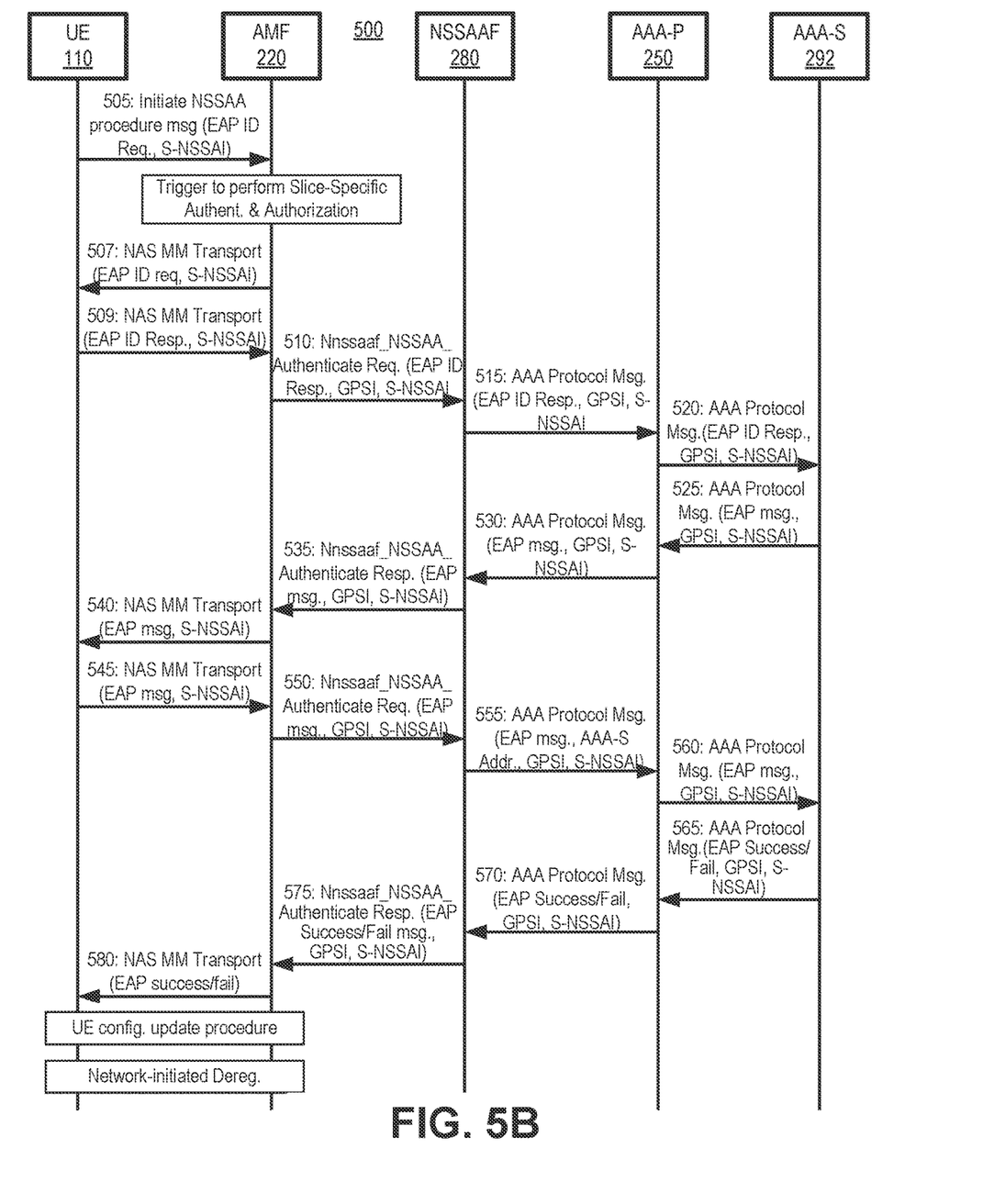
Figure 5C:
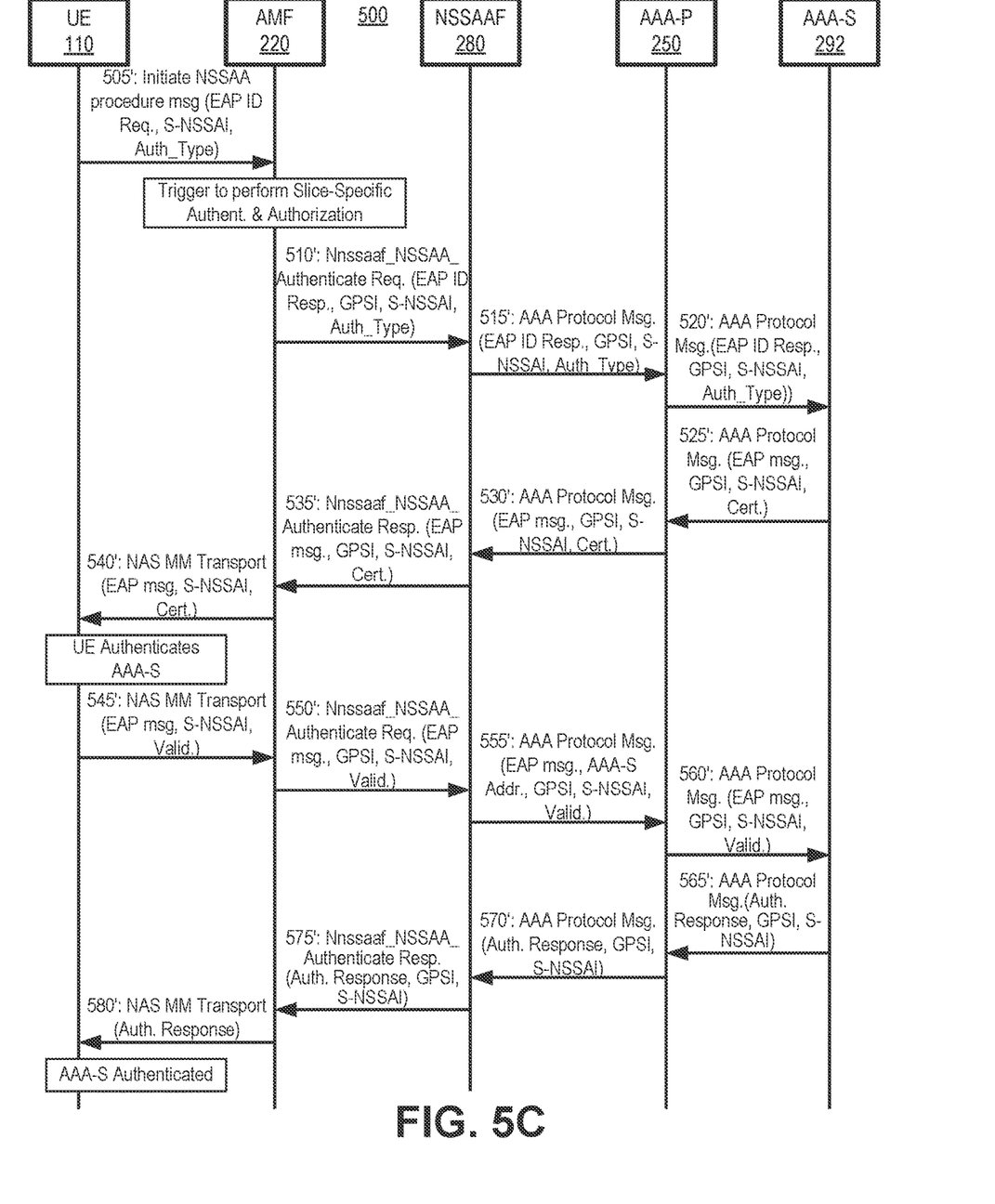

FIGS. 5A-5C are diagrams illustrating communications for performing a UE-initiated authentication and authorization update to NSSAA in a portion 500 of network environment 100. Network portion 500 may include UE device 110, AMF 220, NSSAAF 280, AAA-P 250, and AAA-S 292. FIGS. 5A-5C provide simplified illustrations of communications in network portion 500 and are not intended to reflect every signal or communication exchanged between devices/functions.

As shown in FIG. 5A, UE device 110 may provide an initiate NSSAA procedure message 505 to AMF 220. Initiate NSSAA procedure message 505 may correspond, for example, to request NSSAA update message 405 described above. Along with a particular EAP ID request (e.g., update, delete, etc., referred to in FIG. 5A as "EAP ID Req."), initiate NSSAA procedure message 505 may include S-NSSAI.

AMF 220 may receive message 505 and, in response, may initiate a corresponding NSSAA procedure (e.g., update, revocation, etc.). Assuming the request in message 505 is valid, AMF 220 may select an access type (e.g., 3GPP or non-3GPP access type) to be used to perform the NSSAA procedure based on network policies. AMF 220 may also retrieve a GPSI for UE device 110. AMF 220 may send a message to initiate an NSSAA procedure (including message 505 or the corresponding parameters extracted from message 505) to NSSAAF 280 in a Nnssaaf_NSSAA_Authenticate Request message 510 or a similar message. Parameters for Nnssaaf_NSSAA_Authenticate Request message 510 may include the EAP ID request, the GPSI for the UE, and the S-NSSAI.

NSSAAF 280 may receive message 510. Assuming AAA 250 is an AAA-P (e.g., because AAA-S 292 belongs to a third party and the operator deploys a proxy towards third parties), NSSAAF 280 may forward the initiate NSSAA procedure message to AAA-P 250, as shown by reference 515 in FIG. 5A. (Alternatively, if no proxy were used, NSSAAF 280 would forward the initiate NSSAA procedure message directly to an AAA-S.) NSSAAF 280 may send NSSAA procedure requests toward the appropriate AAA-S 292 (e.g., via AAA-P 250) based on local configuration of AAA-S address per S-NSSAI. NSSAAF 280 may use an AAA protocol message 515 of the same protocol supported by AAA-P 250/AAA-S 292. AAA protocol message 515 may include the EAP ID request, GPSI, and S-NSSAI from message 510.

As shown at ref 520, AAA-P 250 may forward the initiate NSSAA procedure message to AAA-S 292 addressable by the AAA-S address together with S-NSSAI and GPSI. AAA-S 292 may store the GPSI to create an association with the EAP Identity in the initiate NSSAA procedure message, so AAA-S 292 can later use the GPSI to revoke authorization or to trigger re-authentication.

As shown by references 525 through 560 of FIG. 5A, EAP messages are exchanged between AAA-S 292 and UE device 110 to authenticate UE device 110 for the designated network slice. One or more iterations of these EAP message exchanges may occur. After receiving AAA protocol message 560 (which may include an EAP message originating from UE device 110, the GPSI, and S-NSSAI), AAA-S 292 may determine if the requested update or revocation procedure is successful. For example, AAA-S 292 may store the S-NSSAI for which authorization has been granted. AAA-S 292 may send an EAP-Success/Failure message 565 to AAA-P 250 (or, if AAA-P 250 is not present, directly to NSSAAF 280) including the GPSI and S-NSSAI.

AAA-P 250 (if used) sends an AAA Protocol message 570 (including EAP-Success/Failure, GPSI, and S-NSSAI) to forward the decision of AAA-S 292 to NSSAAF 280. Using this information from AAA-P 250, NSSAAF 280 sends Nnssaaf_NSSAA_Authenticate Response 575 (including EAP-Success/Failure, GPSI, and S-NSSAI) to the AMF 220. AMF 220 may receive response 575 and may transmit a NAS MM Transport message 580 (indicating EAP-Success/Failure) to UE device 110. AMF may store the EAP result (e.g., as indicated in response 575) for each S-NSSAI for which the NSSAA procedure is performed.

If a new Allowed NSSAI and/or new Rejected S-NSSAIs need to be delivered to UE device 110, or if AMF re-allocation is required, AMF 220 may initiate a UE Configuration Update procedure for each Access Type. Additionally, if the NSSAA procedure fails for all S-NSSAIs in the existing Allowed NSSAI for UE device 110 and for all S-NSSAIs in the Requested NSSAI, and no default S-NSSAI could be added in the Allowed NSSAI, AMF 220 may execute a Network-initiated Deregistration procedure.

FIG. 5B illustrates a variation of the UE-initiated authentication and authorization update to NSSAA shown in FIG. 5A. Referring to FIG. 5B, UE device 110 may provide initiate NSSAA procedure message 505 to AMF 220. AMF 220 may receive message 505 and, in response, may send an EAP Identity Request for the S-NSSAI in a NAS MM Transport message that 507 includes the S-NSSAI. UE device 110 may provide an EAP Identity Response for the S-NSSAI, along with the S-NSSAI, in an NAS MM Transport message 509 towards the AMF.

AMF 220 may also retrieve a GPSI for UE device 110. AMF 220 may send a message to initiate an NSSAA procedure (including message 509 or the corresponding parameters extracted from message 509) to NSSAAF 280 in a Nnssaaf_NSSAA_Authenticate Request message 510. Parameters for Nnssaaf_NSSAA_Authenticate Request message 510 may include the EAP ID response, the GPSI for the UE, and the S-NSSAI. NSSAAF 280 may receive message 510, and network portion 500 may continue to process the EAP ID response in a manner similar to that described above in connection with FIG. 5A.

While FIGS. 5A and 5B illustrate communications for a UE-initiated NSSAA update procedure, in another implementation, a UE-initiated slice-specific authorization revocation procedure may use a similar initiate NSSAA procedure message 505 corresponding, for example, to request NSSAA delete message 415 described above. In still another implementation, a UE-initiated slice-specific mutual authentication procedure may use a similar initiate NSSAA procedure message 505 corresponding, for example, to request NSSAA mutual authentication message 445 described above. In response to receiving message 415/505, AMF 220 may forward message 415/505 (or corresponding parameters) and a GSPI to NSSAAF 280 for starting revoke authorization procedure. In still another implementation, network device 135/294 or computing device 205 may generate message 505 instead of UE 110. In this implementation, message 505 may correspond, for example, to request NSSAA update message 425 or request NSSAA delete message 435 described above.

FIG. 5C illustrates another variation of a UE-initiated authentication and authorization update to NSSAA. More particularly, FIG. 5C depicts a communications for performing an on-demand mutual authentication of AAA-S 292 and UE device 110, initiated by UE device 110. Referring to FIG. 5C, UE device 110 may provide initiate NSSAA procedure message 505' to AMF 220. Initiate NSSAA procedure message 505' may correspond, for example, to message 445 or 455 described above. AMF 220 may receive message 505' and, in response, send a message to initiate an NSSAA procedure (including message 505' or the corresponding parameters extracted from message 505') to NSSAAF 280 in a Nnssaaf_NSSAA_Authenticate Request message 510' or a similar message. In the example of FIG. 5C, parameters for message 510' may include the EAP ID request, the GPSI for the UE, the S-NSSAI, and the authentication type flag (e.g., indicating mutual authentication). Alternatively, parameters for Nnssaaf_NSSAA_Authenticate Request message 510' may include the EAP ID request, the GPSI for the UE, the S-NSSAI, and an AAA-S_ID).

NSSAAF 280 may receive message 510' and forward the initiate NSSAA procedure message to AAA-P 250 as AAA protocol message 515'. AAA protocol message 515' may include the EAP ID request, GPSI, S-NSSAI, and the Auth_Type flag from message 510. AAA-P 250 may forward message 515' to AAA-S as AAA protocol message 520' (including the same parameters).

In response to the mutual authentication request parameters in message 520', AAA-S 292 may provide an authentication response message containing its credential (e.g. AAA-S 292's digital X.509v3 certificate). As shown by messages 525'-540', AAA-S 292 may forward the certificate through the core network to UE 110. UE 110 may receive the certificate via message 540'. Upon receiving the credential associated with the AAA-S 292, UE device 110 may validate the credential, and then the UE device 110 may send a challenge message (e.g. message containing a random value) toward AAA-S 292 in order to validate that AAA-S 292 is the true owner of the identity. As shown by messages 545'-560', UE device 110 may forward the challenge message including a validation ("Valid.") parameter with the random value to AAA-S 292.

In response to the challenge of message 560', AAA-S 292 may respond to the challenge and generate a challenge response (e.g., signing the random value using the AAA-S 292's private key associated with the public key within the AAA-S 292's digital certificate). The challenge response (e.g., "Auth_Response) that has been generated by the AAA-S 292 may be sent, via messages 565'-580', to UE device 110. UE device 110 may then validate the challenge response received from the AAA-S 292 using the credential (e.g. public key in the AAA-S 292's digital certificate) that was provided by the AAA-S 292. UE device 110 may then validate the challenge response received from the AAA-S 292 using the credential (e.g., public key in the AAA-S 292's digital certificate) that was provided by the AAA-S 292.

UE device 110 may terminate services (e.g., sending of video feed) to the slice in case the authentication of the AAA-S 292 fails or may initiate a re-authentication procedure. The use of mutual authentication between UE device 110 and AAA-S 292 may be determined by pre-configured policy or by an AI/ML agent based on risk profile associated with the data associated with the slice. Similarly, the use of one-way authentication where the UE device 110 authenticates the AAA-S 292 or the AAA-S 292 authenticates the UE device 110 may be determined by pre-configured policy or based on AI/ML agent based on risk profile associated with the data associated with the slice.

Figure 6:
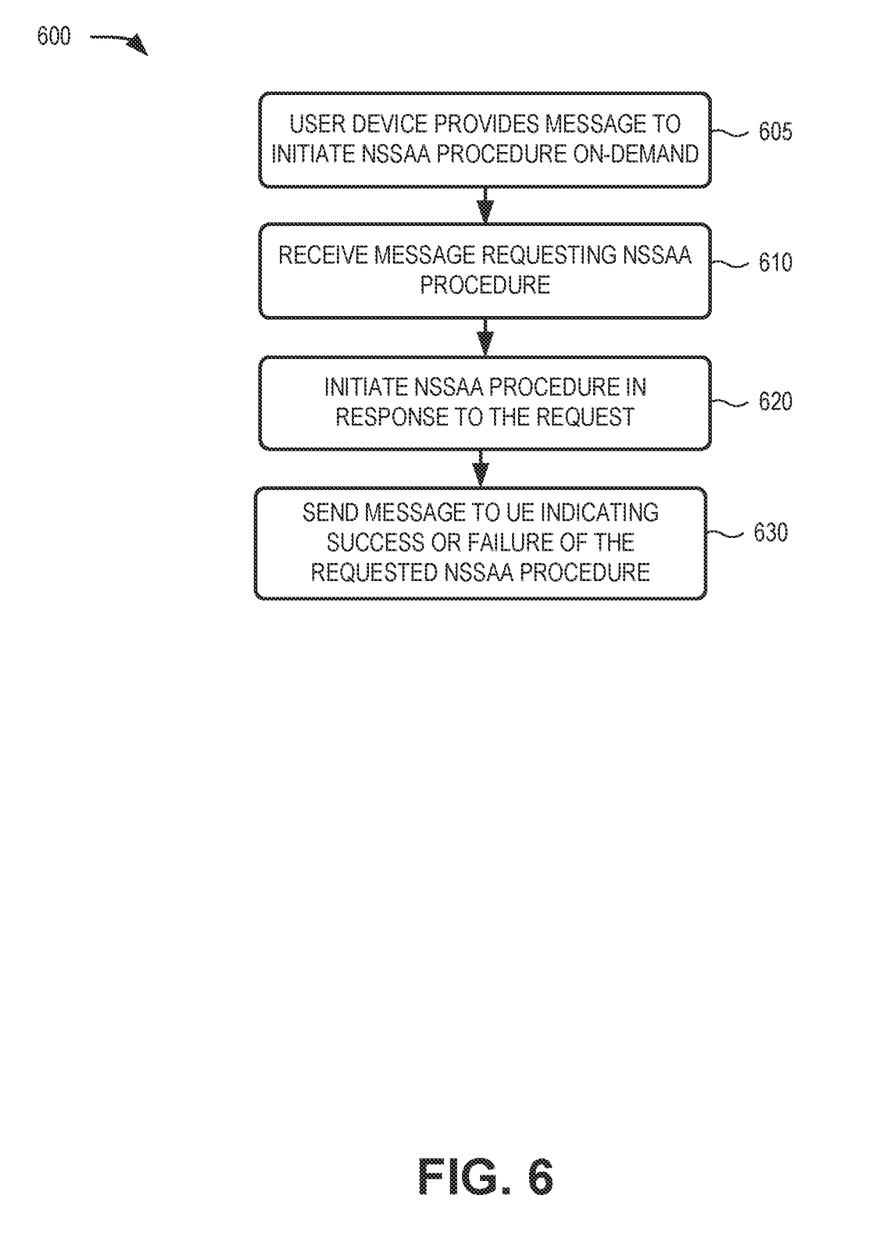
FIG. 6 is a flow diagram illustrating an example process for performing a UE-initiated NSSAA update or revocation procedure, according to an implementation described herein.

FIG. 6 is a flow diagram illustrating an example process 600 for performing a UE-initiated NSSAA update or revocation procedure, according to an implementation described herein. In one implementation, process 600 may be implemented by AMF 220. In another implementation, process 600 may be implemented by AMF 220, UE device 110, and/or one or more other devices in network environment 100.

Process 600 may include a user device providing a message to initiate a NSSAA procedure on-demand (block 605). For example, UE device 110 or computing device 205 may send an initiate NSSAA procedure message 505 (e.g., request NSSAA update message 405, request NSSAA delete message 415, request NSSAA mutual authentication message 445, or on-demand NSSAA authentication request message 455). A determination to send initiate NSSAA procedure message 505 may be based on, for example, a network administrator decision or a learned interval derived by artificial intelligence (AI) and/or machine learning (ML).

Process 600 may also include receiving the message requesting the NSSAA procedure (block 610). For example, AMF 220 may receive from UE device 110, via the NAS MM transfer message, the initiate NSSAA procedure message 505. Message 505 may include an EAP ID and S-NSSAI for a network slice. According to some implementations, message 505 may additionally include an AAA-S_ID and/or an authentication type flag. Alternatively, AMF 220 may receive from network device 135/294, via a HTTP MM transfer message, an initiate NSSAA procedure message 505, such as request NSSAA update message 425 or request NSSAA delete message 435.

Process 600 may further include initiating an NSSAA procedure in response to the request (block 620). For example, in response to message 505, AMF 220 may retrieve a GPSI for UE device 110 and send a message 510 to NSSAAF 280 to initiate an NSSAA procedure. Message 510 may forward, or include parameters from the corresponding parameters extracted from message 505. In one implementation, AMF 220 may provide message 510 via a structured Nnssaaf interface (e.g., Nnssaaf_NSSAA_Authenticate Request, Nnssaaf_NSSAA_Revocation Request, etc.).

Process 600 may further include sending to the UE device a message indicating success or failure of the requested NSSAA procedure (block 630). For example, after successful completion of EAP messages to update authentication, AMF 220 may transmit a NAS MM Transport message 580 (e.g., indicating EAP-Success) to UE device 110.

The foregoing description of implementations provides illustration and description, but is not intended to be exhaustive or to limit the invention to the precise form disclosed. Modifications and variations are possible in light of the above teachings or may be acquired from practice of the invention. For example, while a series of messages and/or blocks have been described with regard to FIGS. 5A, 5B, 5C, and 6, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a network device in a core network, a message initiated by a user equipment (UE) device outside of the core network, wherein the message includes a request to trigger a Network Slice-Specific Authentication and Authorization (NSSAA) procedure, and wherein the request includes an Extensible Authentication Protocol Identity (EAP ID) and Single-Network Slice Selection Assistance Information (S-NSSAI) for the UE device; and
   sending, by the network device and in response to the request, an authentication request to a NSSAA function (NSSAAF), wherein the authentication request includes the EAP ID and the S-NSSAI.

2. The method of claim 1, wherein the request to trigger the NSSAA procedure includes a mutual authentication procedure with an authentication, authorization, and accounting server (AAA-S).

3. The method of claim 1, wherein the message includes a Non-Access Stratum (NAS) Mobility Management (MM) transport message.

4. The method of claim 1, wherein the request to trigger the NSSAA procedure causes an access and mobility management function (AMF) to perform the NSSAA update procedure without a separate determination from the AMF or a re-authentication request from an authentication, authorization, and accounting server (AAA-S).

5. The method of claim 1, wherein sending the authentication request further comprises:
   sending a Generic Public Subscription Identifier (GPSI) of the UE device.

6. The method of claim 1, wherein the NSSAA procedure includes a NSSAA update procedure or a NSSAA revocation procedure.

7. The method of claim 1, wherein the network device includes an access and mobility management function (AMF).

8. The method of claim 1, wherein the message includes one of a dedicated EAP identity update message format or a dedicated EAP identity revocation message format.

9. The method of claim 1, wherein sending the authentication request further comprises:
   sending the authentication request via a Nnssaaf interface.

10. A network device comprising:
    a memory for storing instructions; and
    one or more processors configured to execute the instructions to:
       receive, by the network device in a core network, a message initiated by a user equipment (UE) device outside of the core network, wherein the message includes a request to trigger a Network Slice-Specific Authentication and Authorization (NSSAA) procedure, and wherein the request includes an Extensible Authentication Protocol Identity (EAP ID) and Single-Network Slice Selection Assistance Information (S-NSSAI) for the UE device; and
       send, in response to the request, an authentication request to a NSSAA function (NSSAAF), wherein the authentication request includes the EAP ID and the S-NSSAI.

11. The network device of claim 10, wherein the request to trigger the NSSAA procedure includes a dedicated EAP identity update message format.

12. The network device of claim 10, wherein the request to trigger the NSSAA procedure includes a dedicated EAP identity revocation message format.

13. The network device of claim 10, wherein the message includes a Non-Access Stratum (NAS) Mobility Management (MM) transport message.

14. The network device of claim 10, wherein the message uses a Hypertext Transfer Protocol (HTTP).

15. The network device of claim 10, wherein the request to trigger the NSSAA procedure causes an access and mobility management function (AMF) to perform the NSSAA procedure without a separate determination from the AMF or a re-authentication request from an authentication, authorization, and accounting server (AAA-S).

16. The network device of claim 10, wherein, when triggering the NSSAA procedure, the one or more processors are further configured to execute the instructions to:
    forward a Generic Public Subscription Identifier (GPSI) of the UE device.

17. The network device of claim 10, wherein the NSSAA procedure includes a NSSAA update procedure or a NSSAA revocation procedure.

18. The network device of claim 10, wherein the network device includes an access and mobility management function (AMF).

19. A non-transitory computer-readable medium containing instructions executable by at least one processor of a network device, the instructions configured for:
    receiving, by a network device in a core network, a message initiated by a user equipment (UE) device outside of the core network, wherein the message includes a request to trigger a Network Slice-Specific Authentication and Authorization (NSSAA) procedure, and wherein the request includes an Extensible Authentication Protocol Identity (EAP ID) and Single-Network Slice Selection Assistance Information (S-NSSAI) for the UE device; and
    sending, by the network device and in response to the request, an authentication request to a NSSAA function (NSSAAF), wherein the authentication request includes the EAP ID and the S-NSSAI.

20. The non-transitory computer-readable medium of claim 19, wherein the instructions for receiving the message are further configured for:
    receiving the message via a Non-Access Stratum (NAS) protocol.

* * * * *